United States Patent
Paramasivam et al.

(10) Patent No.: US 9,553,288 B2
(45) Date of Patent: Jan. 24, 2017

(54) STEP CONFIGURATION FOR TRACTION BATTERY HOUSING

(71) Applicant: Ford Global Technologies, LLC, Dearborn, MI (US)

(72) Inventors: Saravanan Paramasivam, South Lyon, MI (US); James Lawrence Swoish, Northville, MI (US); Daniel Miller, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 290 days.

(21) Appl. No.: 14/464,165

(22) Filed: Aug. 20, 2014

(65) Prior Publication Data
US 2016/0056429 A1  Feb. 25, 2016

(51) Int. Cl.
*H01M 2/10* (2006.01)
*B60K 1/04* (2006.01)

(52) U.S. Cl.
CPC ............ *H01M 2/1083* (2013.01); *B60K 1/04* (2013.01); *B60Y 2306/01* (2013.01); *B60Y 2410/115* (2013.01); *H01M 2220/20* (2013.01)

(58) Field of Classification Search
None
See application file for complete search history.

(56) References Cited

U.S. PATENT DOCUMENTS

| 6,399,244 | B1 * | 6/2002 | Hinotu | H01M 2/06 |
| | | | | 429/175 |
| 6,982,131 | B1 * | 1/2006 | Hamada | H01M 2/0237 |
| | | | | 429/148 |
| 7,855,011 | B2 | 12/2010 | Meschter | |
| 8,256,552 | B2 | 9/2012 | Okada | |
| 2005/0260488 | A1 | 11/2005 | Zhou et al. | |
| 2009/0042098 | A1 * | 2/2009 | Nakayama | H01M 2/043 |
| | | | | 429/179 |
| 2009/0325049 | A1 | 12/2009 | Niedzwiecki et al. | |
| 2010/0316895 | A1 | 12/2010 | Hedrich et al. | |
| 2011/0129711 | A1 * | 6/2011 | Ahn | H01M 2/30 |
| | | | | 429/94 |
| 2011/0140666 | A1 * | 6/2011 | Han | H01M 10/0587 |
| | | | | 320/128 |
| 2012/0321934 | A1 | 12/2012 | Hopkins et al. | |

(Continued)

FOREIGN PATENT DOCUMENTS

EP 1059679 A2 12/2000
EP 2450978 A2 5/2012

*Primary Examiner* — Tracy Dove
(74) *Attorney, Agent, or Firm* — David B. Kelley; Brooks Kushman P.C.

(57) ABSTRACT

A vehicle traction battery assembly is provided which may include a housing, a battery system supported within the housing, and a connector electrically connected with the system and extending through and away from the recessed face into a region normal to the recessed face and adjacent to the ledge such that the ledge limits travel of objects into the region impacting the lateral end. The lateral end may have a step configuration defined by the ledge and the recessed face. The housing may also include a middle face extending between the ledge face and recessed face, opposing side faces, and a lower face. The connector may be a battery control interface connector, an accessory connector, or a high-voltage connector.

15 Claims, 2 Drawing Sheets

(56) References Cited

U.S. PATENT DOCUMENTS

| | | |
|---|---|---|
| 2013/0004806 A1 | 1/2013 | Wang |
| 2015/0207130 A1* | 7/2015 | Maguire ............. H01M 2/1083 |
| | | 429/97 |
| 2016/0111702 A1* | 4/2016 | Ohsumi ................ H01M 2/305 |
| | | 429/179 |

* cited by examiner

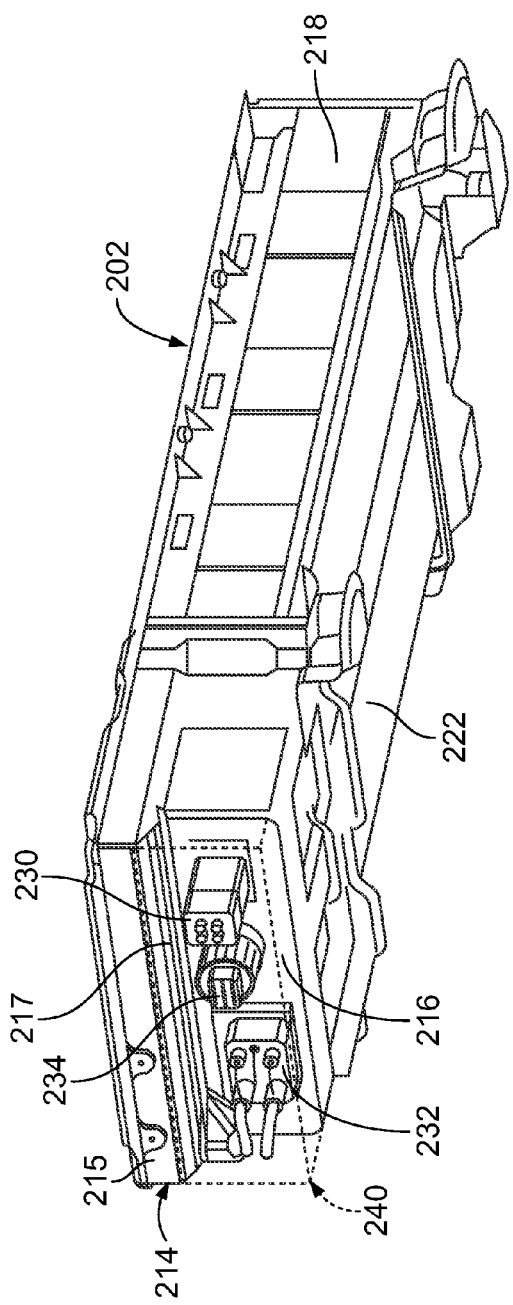
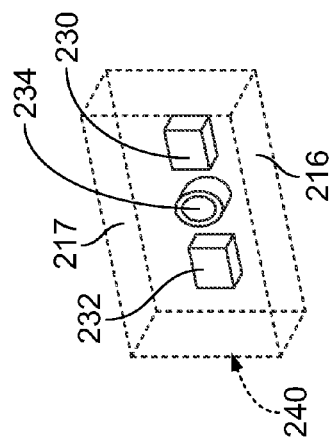
FIG. 4
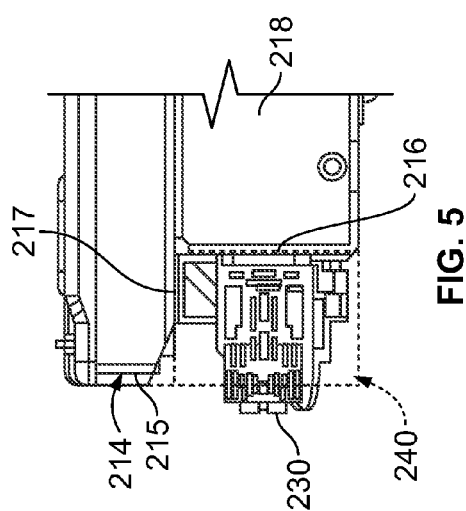
FIG. 6
FIG. 5

__US 9,553,288 B2__

STEP CONFIGURATION FOR TRACTION BATTERY HOUSING

TECHNICAL FIELD

This disclosure relates to support structures for vehicle traction batteries and battery systems.

BACKGROUND

Vehicles such as battery-electric vehicles (BEVs), plug-in hybrid-electric vehicles (PHEVs), mild hybrid-electric vehicles (MHEVs), or full hybrid-electric vehicles (FHEVs) may contain an energy storage device, such as a high voltage (HV) battery, to act as a propulsion source for the vehicle. The HV battery may include components and systems to assist in managing vehicle performance and operations. The HV battery may include one or more arrays of battery cells interconnected electrically between battery cell terminals and interconnector busbars. The HV battery and surrounding environment may include a thermal management system to assist in managing temperature of the HV battery components, systems, and individual battery cells.

SUMMARY

A vehicle traction battery assembly includes a housing, a battery system supported within the housing, and a connector electrically connected with the system and extending through and away from the recessed face into a region normal to the recessed face and adjacent to the ledge such that the ledge limits travel of objects into the region impacting the lateral end. The lateral end has a step configuration defined by the ledge and the recessed face. The housing may also include a middle face extending between the ledge face and recessed face, opposing side faces, and a lower face. The faces may further define the region. The connector may be a battery control interface connector, an accessory connector, or a high-voltage connector. The connector may extend past the ledge. Another connector may extend through and away from the recessed face into the region. The connector may be electrically connected to a power electronics module, a DC/DC converter module, or an electric machine.

A housing for a high voltage battery includes opposing longitudinal side faces, a lower face, a lateral end, and a middle face. The lateral end defines a recessed face and a ledge face substantially parallel to one another, and the middle face extends therebetween. The planes defined by the faces at least partially define a region exterior to the housing and normal to the recessed face. The recessed face defines a first opening for a connector to extend therethrough and into the region. The lateral end may further define a first internal cavity sized to receive a battery control module. The housing may define a second internal cavity located adjacent to the first cavity and sized to receive a battery cell array. The first opening may be sized for a battery control interface connector to extend therethrough. The recessed face may define a second opening sized for an accessory connector to extend therethrough. The recessed face may define a third opening sized for a high voltage connector to extend therethrough.

A traction battery assembly includes a battery system, a housing enclosing the system, and a connector electrically connected with the system. The housing includes an end defining a ledge on an outside of the housing and a recessed face adjacent to the ledge such that the ledge and recessed face have a step configuration. The connector extends through the recessed face and underneath the ledge. The connector may be electrically connected to a power electronics module, a DC/DC converter module, or an electric machine. The connector may be a battery control interface connector, an accessory connector, or a high voltage connector. The assembly may include another connector which may extend through the recessed face and underneath the ledge. One of the connectors may extend past the ledge.

BRIEF DESCRIPTION OF THE DRAWINGS

FIG. 4 is a perspective view of the traction battery of FIG. 3.

FIG. 5 is a fragmentary side view of the traction battery of FIG. 3.

FIG. 6 is an illustrative fragmentary view of a region into which one or more connectors may extend from the housing of FIG. 3.

DETAILED DESCRIPTION

Figures 1, 2, 3:
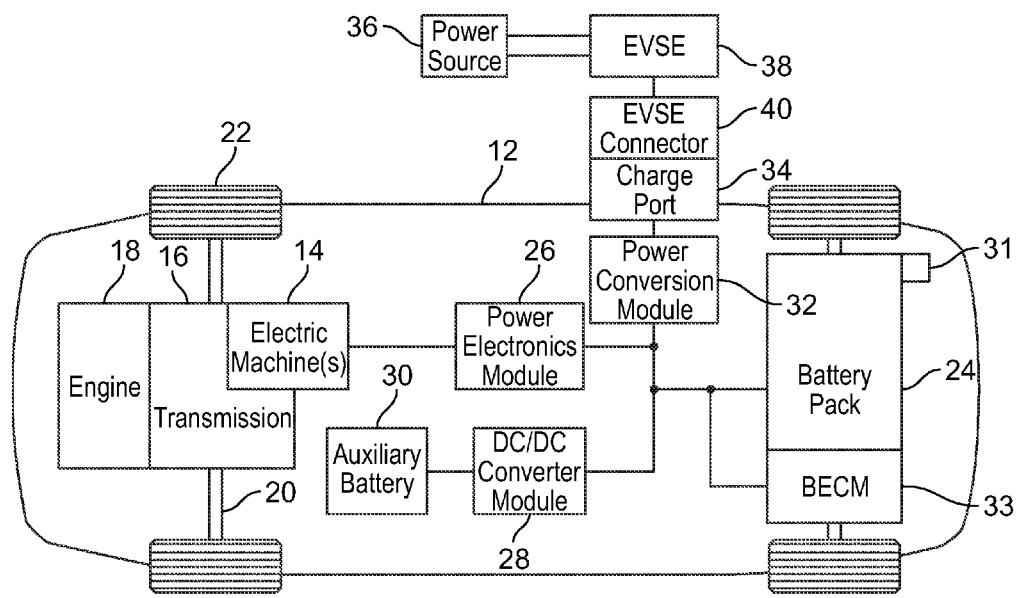
FIG. 1 is a schematic illustration of a battery electric vehicle.
FIG. 2 is a plan view of an example of a portion of a traction battery including a housing.
FIG. 3 is a plan view of another example of a portion of a traction battery including a housing having a step configuration at a lateral end of the housing.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

FIG. 1 depicts a schematic of an example of a plug-in hybrid-electric vehicle (PHEV). A vehicle 12 may comprise one or more electric machines 14 mechanically connected to a hybrid transmission 16. The electric machines 14 may be capable of operating as a motor or a generator. In addition, the hybrid transmission 16 may be mechanically connected to an engine 18. The hybrid transmission 16 may also be mechanically connected to a drive shaft 20 that is mechanically connected to the wheels 22. The electric machines 14 may provide propulsion and deceleration capability when the engine 18 is turned on or off. The electric machines 14 may also act as generators and provide fuel economy benefits by recovering energy that would normally be lost as heat in the friction braking system. The electric machines 14 may also provide reduced pollutant emissions since the hybrid-electric vehicle 12 may be operated in electric mode or hybrid mode under certain conditions to reduce overall fuel consumption of the vehicle 12.

A traction battery or battery pack 24 stores and provides energy that may be used by the electric machines 14. The traction battery 24 typically provides a high voltage DC output from one or more battery cell arrays, sometimes referred to as battery cell stacks, within the traction battery 24. The battery cell arrays may include one or more battery cells. The traction battery 24 is electrically connected to one or more power electronics modules 26 through one or more contactors (not shown). The one or more contactors may isolate the fraction battery 24 from other components when opened and connect the traction battery 24 to other components when closed. The power electronics module 26 is also electrically connected to the electric machines 14 and provides the ability to bi-directionally transfer electrical energy between the traction battery 24 and the electric machines 14. For example, a typical traction battery 24 may provide a DC voltage while the electric machines 14 may require a three-phase AC voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the fraction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., 12V battery).

A battery electronic control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24. The temperature sensor 31 may also be located on or near the battery cells within the traction battery 24. It is also contemplated that more than one temperature sensor 31 may be used to monitor temperature of the battery cells.

The vehicle 12 may be, for example, an electric vehicle such as a PHEV, a FHEV, a MHEV, or a BEV in which the traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via discrete conductors.

The battery cells, such as a prismatic cell, may include electrochemical cells that convert stored chemical energy to electrical energy. Prismatic cells may include a housing, a positive electrode (cathode) and a negative electrode (anode). An electrolyte may allow ions to move between the anode and cathode during discharge, and then return during recharge. Terminals may allow current to flow out of the cell for use by the vehicle. When positioned in an array with multiple battery cells, the terminals of each battery cell may be aligned with opposing terminals (positive and negative) adjacent to one another and a busbar may assist in facilitating a series connection between the multiple battery cells. The battery cells may also be arranged in parallel such that similar terminals (positive and positive or negative and negative) are adjacent to one another. For example, two battery cells may be arranged with positive terminals adjacent to one another, and the next two cells may be arranged with negative terminals adjacent to one another. In this example, the busbar may contact terminals of all four cells.

Different battery pack configurations may be available to address individual vehicle variables including packaging constraints and power requirements. The battery cell array 88 may be contained within a cover or housing (not shown) to protect and enclose the battery cell array 88 and other surrounding components, such as the DC/DC converter module 28 and the BECM 33. The battery cell array 88 may be positioned at several different locations including below a front seat, below a rear seat, or behind the rear seat of the vehicle, for example. However, it is contemplated the battery cell array 88 may be positioned at any suitable location in the vehicle 12.

FIG. 2 shows a portion of a traction battery assembly 100. The traction battery assembly 100 includes a first assembly portion 102 and a second assembly portion 104. The first assembly portion 102 defines an internal cavity (not shown) sized to receive a battery cell array (not shown). The second assembly portion 104 defines an internal cavity (not shown) sized to receive a battery control module (not shown). A housing 108 contains components of the traction battery assembly 100. A plurality of connectors 110 extend from the second assembly portion 104. The plurality of connectors 110 may be high voltage connectors. As shown in FIG. 2, the housing does not provide an extension or feature to assist in limiting a travel of objects which may impact the plurality of connectors 110.

FIGS. 3 through 6 show an example of a traction battery assembly 200. The traction battery assembly 200 may include a housing 202 to contain a first assembly portion 204 and a second assembly portion 206. The first assembly portion 204 may define an internal cavity (not shown) sized to receive a battery cell array (not shown). The second assembly portion 206 may define an internal cavity (not shown) sized to receive a battery control module (not shown). An example of a battery system may include components for a traction battery such as one or more battery cell arrays, a thermal management system, and electronic components to support operation thereof. The housing 202 may include a lateral end 212 having a step configuration defined by a ledge 214 and a recessed face 216. The ledge 214 may include a ledge face 215 substantially parallel to the recessed face 216 and a middle face 217 extending substantially perpendicularly therebetween. The housing 202 may include opposing side faces 218. The housing 202 may include an upper face 220 and a lower face 222. It is contemplated that the housing 202 may be of more than one housing component. For example, the housing 202 may include first and second housing components which correspond to the first assembly portion 204 and the second assembly portion 206. The housing 202 may be configured to contain and support a battery system therein and may include features to assist in providing electrical connections between the battery system and various vehicle components.

For example, one or more connectors may be electrically connected with the battery system contained within the housing 202 and may extend away from the recessed face 216. The recessed face 216 may define one or more openings corresponding with the one or more connectors such that the one or more connectors may extend therethrough. The one or more connectors may be battery system connectors such as an accessory connector 230, a high voltage connector 232, and a battery control interface connector 234. The accessory connector 230 may connect the traction battery to high voltage accessories such as a vehicle climate control system or a DC/DC converter module which may convert high voltage power from the traction battery to low voltage power for use with accessories that require lower voltage. The high voltage connector 232 may, for example, connect a traction battery contained within the housing 202 to an electric machine. One or more wires may connect the traction battery to the electric machine via the high voltage connector 232. The battery control interface connector 234 may connect the traction battery to a module, such as a power electronics module that receives battery cell information, such as current, voltage, temperature, and state of charge. One or more wires may connect the traction battery to the module via the battery control interface connector 234.

The one or more connectors may extend into a region 240 exterior to the housing 202. The one or more connectors may extend through the region 240. The region 240 may be normal to the recessed face 216 and adjacent to the ledge 214 such that, for example and in contrast to the configuration of the housing 108 in FIG. 2, the ledge 214 limits travel of objects into the region 240 impacting the lateral end 212. The ledge 214 and the recessed face 216 may at least partially define the region 240. Further, planes defined by the ledge face 215, recessed face 216, the middle face 217, the opposing side faces 218, and the lower face 222 may define the region 240.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:
1. A vehicle traction battery assembly comprising:
a housing including a lateral end having a step configuration defined by a ledge and a recessed face;
a battery system supported within the housing; and
a connector electrically connected with the system and extending through and away from the recessed face into a region normal to the recessed face and adjacent to the ledge such that the ledge limits travel of objects into the region impacting the lateral end,
wherein the connector is arranged with the housing such that the connector extends past the ledge.
2. The assembly of claim 1, wherein the housing further includes a middle face extending between the ledge and the recessed face, opposing side faces, and a lower face, and wherein the faces further define the region.
3. The assembly of claim 1, wherein the connector is a battery control interface connector, an accessory connector, or a high-voltage connector.
4. The assembly of claim 1, further comprising another connector extending through and away from the recessed face into the region.
5. The assembly of claim 1, wherein the connector is electrically connected to a power electronics module, a DC/DC converter module, or an electric machine.
6. A housing for a high voltage battery comprising:
opposing longitudinal side faces;
a lower face; and
a lateral end defining a recessed face and a ledge face substantially parallel to one another, and a middle face extending therebetween, wherein planes defined by the faces at least partially define a region exterior to the housing and normal to the recessed face and wherein the recessed face defines a first opening for a connector to extend therethrough, into the region, and past the ledge face.
7. The housing of claim 6, wherein the lateral end further defines a first internal cavity sized to receive a battery control module.
8. The housing of claim 7, wherein the housing defines a second internal cavity located adjacent to the first cavity and sized to receive a battery cell array.
9. The housing of claim 6, wherein the first opening is sized for a battery control interface connector to extend therethrough.
10. The housing of claim 6, wherein the recessed face defines a second opening sized for an accessory connector to extend therethrough.
11. The housing of claim 10, wherein the recessed face defines a third opening sized for a high voltage connector to extend therethrough.
12. A traction battery assembly comprising:
a battery system;
a housing enclosing the system and including an end defining a ledge on an outside of the housing and a recessed face adjacent to the ledge such that the ledge and recessed face have a step configuration; and a connector electrically connected with the system and extending through the recessed face and underneath and past the ledge.

13. The assembly of claim 12, wherein the connector is electrically connected to a power electronics module, a DC/DC converter module, or an electric machine.

14. The assembly of claim 12, wherein the connector is a battery control interface connector, an accessory connector, or a high voltage connector.

15. The assembly of claim 12, further comprising another connector, and wherein the another connector extends through the recessed face and underneath the ledge.

* * * * *